(12) United States Patent
Dan et al.

(10) Patent No.: US 9,785,901 B2
(45) Date of Patent: Oct. 10, 2017

(54) BUSINESS PROCESS DEVELOPMENT AND RUN TIME TOOL

(75) Inventors: Asit Dan, Pleasantville, NY (US); Claus T. Jensen, Pawling, NY (US)

(73) Assignee: International Business Machines Corporation, Armonk, NY (US)

( * ) Notice: Subject to any disclaimer, the term of this patent is extended or adjusted under 35 U.S.C. 154(b) by 651 days.

(21) Appl. No.: 12/897,284

(22) Filed: Oct. 4, 2010

(65) Prior Publication Data
US 2012/0084213 A1  Apr. 5, 2012

(51) Int. Cl.
G06Q 10/10    (2012.01)
G06Q 10/06    (2012.01)
G06F 11/07    (2006.01)
G06Q 40/06    (2012.01)

(52) U.S. Cl.
CPC ..... *G06Q 10/0635* (2013.01); *G06Q 10/0633* (2013.01); *G06Q 10/103* (2013.01); *G06Q 40/06* (2013.01); *G06F 11/0781* (2013.01); *G06F 11/0793* (2013.01)

(58) Field of Classification Search
None
See application file for complete search history.

(56) References Cited

U.S. PATENT DOCUMENTS 5,153,881 A * 10/1992 Bruckert et al. ............. 714/10
6,920,474 B2   7/2005 Walsh
2001/0016843 A1 * 8/2001 Olson et al. .................. 707/3
2004/0034553 A1 * 2/2004 Cole et al. .................... 705/7
2004/0064436 A1 * 4/2004 Breslin et al. ................ 707/1
2004/0128186 A1 * 7/2004 Breslin et al. .............. 705/10
2004/0230877 A1 * 11/2004 Clark et al. ................. 714/48

(Continued)

OTHER PUBLICATIONS

Elky, "An Introduction to Information System Risk Management," 2006, from Information Security reading Room, SANS Institute.*

(Continued)

*Primary Examiner* — Ivan R Goldberg
(74) *Attorney, Agent, or Firm* — Stephen R. Tkacs; Stephen J. Walder, Jr.; Scott Dobson (57) ABSTRACT

A process development and run time tool identifies dependent relationships between information sources and processes of an enterprise system at design time. The process development and run time tool determines a business value and business risk for each process and stores this information in an information source and process dependency table. The process development and run time tool determines if a particular information source is a critical business risk and if so adds redundancy for the critical risk information source and/or fault tolerance into the process design. An operating system assembles the dependent processes for run time evaluation. If a dependent information source fails at run time, the process development and run time tool identifies each process within the enterprise system that is dependent upon this failed information source. The process development and run time tool informs all stakeholders that rely on information from the failed information source, then prioritizes the elimination of failed information source defects that exceed a predetermined business risk threshold. The process development and run time tool may terminate at risk business processes that exceed a predetermined business risk threshold.

9 Claims, 5 Drawing Sheets

(56) References Cited

U.S. PATENT DOCUMENTS

| | | |
|---|---|---|
| 2005/0114186 A1* | 5/2005 | Heinrich .................... 705/7 |
| 2005/0144062 A1* | 6/2005 | Mittal et al. ................ 705/10 |
| 2006/0015641 A1* | 1/2006 | Ocko et al. ................. 709/236 |
| 2006/0059253 A1* | 3/2006 | Goodman ............ G06Q 10/10 709/223 |
| 2006/0156157 A1* | 7/2006 | Haselden et al. ........... 714/746 |
| 2006/0191012 A1* | 8/2006 | Banzhof et al. ............. 726/25 |
| 2006/0259336 A1* | 11/2006 | Anas et al. .................. 705/7 |
| 2007/0168201 A1* | 7/2007 | Chellam ............... G06Q 10/06 714/48 |
| 2008/0229420 A1* | 9/2008 | Jeschke et al. .............. 726/25 |
| 2009/0276274 A1 | 11/2009 | Sasagawa |
| 2010/0095381 A1* | 4/2010 | Levi ............................. 726/25 |
| 2010/0153906 A1 | 6/2010 | Dan |
| 2010/0211926 A1 | 8/2010 | Dan |
| 2012/0053981 A1* | 3/2012 | Lipps et al. ................. 705/7.28 |

OTHER PUBLICATIONS

Gibb, "A framework for business continuity management," 2006, International Journal of Information Management, vol. 26, pp. 128-141.*

Swanson, et al., "Contingency Planning Guide for Information Technology Systems," 2002, National Institute of Standards and Technology, NIST Special Publication No. NIST-SP-800-34.*

Rud, "Product Metrics for Service-Oriented Infrastructures," 2006, IWSM/MetriKon, pp. 161-174.*

Sayal—"Detecting Time Correlations in Time-Series Data Streams", Technical Report, Intelligent Technologies Enterprise Laboratory HP Laboratories Palo Alto HPL-2004-103, published at www.hpl.hp.com (Jun. 9, 2004).

Thomsen—"Information Impact: Business Analytics Revealed", Intelligent Enterprise, v 4, n 9, 26-34, Jun. 13 2001, ISSN: 1524-3621, published at www.hpl.hp.com (Jun. 13, 2001).

* cited by examiner

FIG. 1

FIG. 2
ENTERPRISE SYSTEM

FIG. 3

INFORMATION SOURCE AND PROCESS DEPENDENCY TABLE
(GENERATED BY PROCESS DEVELOPMENT AND RUN TIME TOOL AT DESIGN TIME)

300

| INFORMATION SOURCE (310) | DEPENDENT PROCESSES (320) | BUSINESS VALUE OF PROCESS (330) | PROCESS BUSINESS RISK (340) | COMPOSITE INFORMATION SOURCE BUSINESS RISK (350) |
|---|---|---|---|---|
| INFORMATION SOURCE 1 (360) | PROCESS A | VALUE 1A | HIGH | MEDIUM |
|  | PROCESS B (365) | VALUE 1B | LOW |  |
|  | PROCESS C (370) | VALUE 1C | MEDIUM |  |
| INFORMATION SOURCE 2 (375) | PROCESS B | VALUE 2B | HIGH | HIGH |
|  | PROCESS C (380) | VALUE 2C | HIGH |  |
| ... | ... | ... | ... | ... |
| INFORMATION SOURCE M (390) | PROCESS N | VALUE MN | TBD | TBD |

FIG. 4

DESIGN TIME PROCESS DEVELOPMENT METHOD AND TOOL

BUSINESS PROCESS DEVELOPMENT AND RUN TIME TOOL

BACKGROUND

The disclosures herein relate generally to information handling systems (IHSs), and more specifically, to management of processes and respective dependent information sources in an IHS.

Information handling systems (IHSs) typically employ operating systems that execute applications or other processes that may require the resources of one or more information sources. IHS operating systems may execute process development and run time tools that analyze or otherwise evaluate the business risks that a particular process and respective dependent information source exhibit in the case of process or information source failure. Business risk development may include process development as well as the evaluation of business process risks with respect to failures of respective information sources on which the processes depend.

BRIEF SUMMARY

In one embodiment, a computer implemented method is disclosed that includes forming at design time, by a process development and run time tool, a dependency table that includes a list of information sources with dependent processes. The dependency table also includes a list of business values, each business value corresponding to a respective dependent process. The dependency table further includes a list of business risks, each business risk corresponding to a respective dependent process. The dependency table still further includes a respective composite information source business risk for each information source in the list of information sources. The method includes identifying at design time, by the process development and run time tool, those information sources of the list of information sources that exhibit a composite information source business risk that exceeds a predetermined business risk threshold, thus providing identified critical information sources. The method also includes providing at design time, fault tolerance to those processes dependent on identified critical information sources. The method further includes detecting at run time, by the process development and run time tool, information source failures of particular information sources, thus designating particular failed information sources. The method also includes identifying at run time, by the process development and run time tool, those processes dependent on the particular failed information sources as exhibiting information source defects. The method further includes disabling at run time, by the process development and run time tool, those processes dependent on the particular failed information sources. The method still further includes communicating at run time, by the process development and run time tool, a list of terminated processes to stakeholders of the terminated processes. The method also includes prioritizing at run time, by the process development and run time tool, failures of particular information sources in accordance with business risk, the prioritizing at run time designating information source failures as critical information source failures or non-critical information source failures in accordance with the predetermined business risk threshold. The method further includes bypassing at run time, by the process development and run time tool, those information source defects that correspond to critical information source failures.

In another embodiment, an information handling system (IHS) is disclosed that includes a processor and information sources coupled to the processor. The IHS also includes a memory coupled to the processor. The memory is configured with a process development and run time tool to form at design time a dependency table that includes a list of information sources with dependent processes, the dependency table further including a list of business values, each business value corresponding to a respective dependent process, the dependency table further including a list of business risks, each business risk corresponding to a respective dependent process, the dependency table further including a respective composite information source business risk for each information source in the list of information sources. The process development and run time tool identifies at design time those information sources of the list of information sources that exhibit a composite information source business risk that exceeds a predetermined business risk threshold, thus providing identified critical information sources. The process development and run time tool also provides at design time fault tolerance to those processes dependent on identified critical information sources. The process development and run time tool further detects at run time information source failures of particular information sources, thus designating particular failed information sources. The process development and run time tool also identifies at run time those processes dependent on the particular failed information sources as exhibiting information source defects. The process development and run time tool also disables at run time those processes dependent on the particular failed information sources. The process development and run time tool further communicates at run time a list of terminated processes to stakeholders of the terminated processes. The process development and run time tool still further prioritizes at run time failures of particular information sources in accordance with business risk, the prioritizing at run time designating information source failures as critical information source failures or non-critical information source failures in accordance with the predetermined business risk threshold. The process development and run time tool also bypasses at run time those information source defects that correspond to critical information source failures.

In yet another embodiment, a process development and run time tool computer program product is disclosed. The computer program product includes a computer readable storage medium. The computer program product also includes first program instructions that form at design time a dependency table that includes a list of information sources with dependent processes, the dependency table further including a list of business values, each business value corresponding to a respective dependent process, the dependency table further including a list of business risks, each business risk corresponding to a respective dependent process, the dependency table further including a respective composite information source business risk for each information source in the list of information sources. The computer program product further includes second program instructions that identify at design time those information sources of the list of information sources that exhibit a composite information source business risk that exceeds a predetermined business risk threshold, thus providing identified critical information sources. The computer program product still further includes third program instructions that provide at design time fault tolerance to those processes dependent on identified critical information sources. The computer program product also includes fourth program instructions that detect at run time information source failures of particular information sources, thus designating particular failed information sources. The computer program product further includes fifth program instructions that identify at run time those processes dependent on the particular failed information sources as exhibiting information source defects. The computer program product still further includes sixth program instructions that disable at run time those processes dependent on the particular failed information sources. The computer program product also includes seventh program instructions that communicate at run time a list of terminated processes to stakeholders of the terminated processes. The computer program product further includes eighth program instructions that prioritize at run time failures of particular information sources in accordance with business risk, the prioritizing at run time designating information source failures as critical information source failures or non-critical information source failures in accordance with the predetermined business risk threshold. The computer program product still further includes ninth program instructions that bypass at run time those information source defects that correspond to critical information source failures. The first, second, third, fourth, fifth, sixth, seventh, eighth and ninth program instructions are stored on the computer readable storage medium.

BRIEF DESCRIPTION OF THE DRAWINGS

The appended drawings illustrate only exemplary embodiments of the invention and therefore do not limit its scope because the inventive concepts lend themselves to other equally effective embodiments.

DETAILED DESCRIPTION

An enterprise system may employ multiple Information handling systems (IHSs) that typically employ operating systems that execute applications or other processes within each IHS. The enterprise system may include multiple information sources that provide information to executing processes in the IHSs of the enterprise system. In other words, a particular process interprets, consumes, or otherwise employs information from an associated information source of the enterprise system. An information source may be a database of information, files on a storage media, or any form of information for use by executing processes within the enterprise system.

The enterprise system may include one or more stakeholders that rely on or benefit from process outputs of those processes that consume information from information sources. In a business environment, enterprise system resources provide for the development and execution of business processes or processes that offer business resource benefits as output. Designers and other entities may assess the risk, such as business risk, of data failure of processes, information sources, or other resources of the enterprise system. Systems with increased robustness or tolerance of information source failures in their process design or information source design are of greater value to clients or users of these systems.

At design time, designers or other entities may model various aspects of the enterprise system and evaluate process execution behavior during simulation of real world activities. During design evaluation, designers may expose business risks that relate to processes that rely on or are dependent upon information sources. These dependent information sources may provide useful or critical information to executing processes. At design time, designers employing process development tools may utilize process modeling languages, such as Business Process Modeling Language (BPML) to model process flow. BPML provides process development tools, designers, and other entities access to process execution input and output data flow. Designers may introduce real world variables and test processes executing within IHS resources to model, evaluate, and improve the robustness of business process design.

Designers may employ modeling languages, such as Business Process Execution Language (BPEL) for modeling of processes executing within an enterprise system or IHS. Designers may employ BPEL or other modeling languages to generate information models (IM)s of the enterprise system for business process risk or process risk assessment as well as other reasons.

During design time, the enterprise system model or IM may include multiple IHSs, information sources, stakeholders, as well as other enterprise system resources. Business processes may fail due to a failure of an associated information source that the process relies or depends on. An information source that a particular process depends on for information is herein referred to as a "dependent information source" from which the particular process consumes information. A process that is dependent upon a particular information source for consuming information is herein referred to as a "dependent process" with respect to that particular information source.

Dependent information sources may fail in more than one manner. For instance, an executing process may fail to consume dependent information source data due to communication or other resource failures or restrictions. Defects or errors in information corresponding to a dependent information source are cause for another type of dependent information source failure. An attempt to extract information or resources from dependent information sources that may exhibit defects is a potential cause of information source failure.

Figure 1:
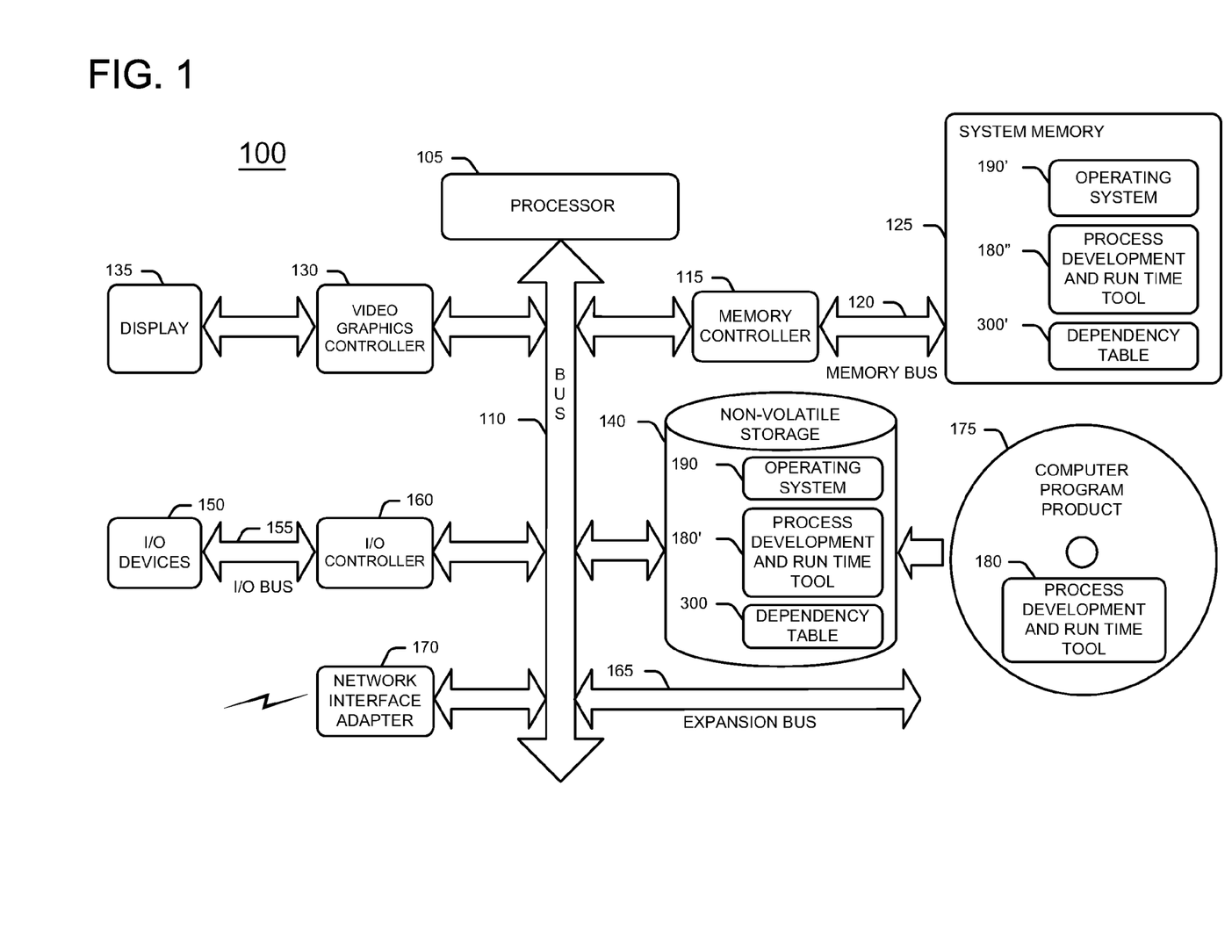
FIG. 1 shows a block diagram of a representative information handling system (IHS) that employs the disclosed process development methodology.

FIG. 1 shows an information handling system 100 including a process development and run time tool 180 that employs the disclosed process development methodology. IHS 100 includes a processor 105 that may include multiple processors, processor cores or other processor elements. IHS 100 processes, transfers, communicates, modifies, stores or otherwise handles information in digital form, analog form or other form. IHS 100 includes a bus 110 that couples processor 105 to system memory 125 via a memory controller 115 and memory bus 120. In one embodiment, system memory 125 is external to processor 105. System memory 125 may be a static random access memory (SRAM) array or a dynamic random access memory (DRAM) array. Processor 105 may also include local memory (not shown) such as L1 and L2 caches (not shown). A video graphics controller 130 couples display 135 to bus 110. Nonvolatile storage 140, such as a hard disk drive, CD drive, DVD drive, or other nonvolatile storage couples to bus 110 to provide IHS 100 with permanent storage of information. I/O devices 150, such as a keyboard and a mouse pointing device, couple to bus 110 via I/O controller 160 and I/O bus 155.

One or more expansion busses 165, such as USB, IEEE 1394 bus, ATA, SATA, PCI, PCIE, DVI, HDMI and other busses, couple to bus 110 to facilitate the connection of peripherals and devices to IHS 100. A network interface adapter 170 couples to bus 110 to enable IHS 100 to connect by wire or wirelessly to a network and other information handling systems. In this embodiment, network interface adapter 170 may also be called a network communication adapter or a network adapter. While FIG. 1 shows one IHS that employs processor 105, the IHS may take many forms. For example, IHS 100 may take the form of a desktop, server, portable, laptop, notebook, netbook, tablet or other form factor computer or data processing system. IHS 100 may take other form factors such as a gaming device, a personal digital assistant (PDA), a portable telephone device, a communication device or other devices that include a processor and memory.

IHS 100 employs an operating system (OS) 190 that may store information on nonvolatile storage 145. IHS 100 includes a computer program product on digital media 175 such as a CD, DVD or other media. In one embodiment, a designer or other entity configures the computer program product with process development and run time tool 180 software to practice the process development methodology. In practice, IHS 100 may store process development and run time tool 180 and OS 190 on nonvolatile storage 145 as process development and run time tool 180' and OS 190'. When IHS 100 initializes, the IHS loads process development and run time tool 180' and OS 190 into system memory 125 for execution as process development and run time tool 180" and OS 190', respectively. In practice, IHS 100 may store a dependency table 300 on non-volatile storage 140. IHS 100 may load dependency table 300 into system memory 125 as dependency table 300'. Process development and run time tool 180 may employ dependency table 300 in accordance with the disclosed process development methodology.

As will be appreciated by one skilled in the art, aspects of the disclosed process development methodology may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product, such as computer program product 175 embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the FIG. 4 and FIG. 5 flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart of FIG. 4 and FIG. 5 and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Figure 4:
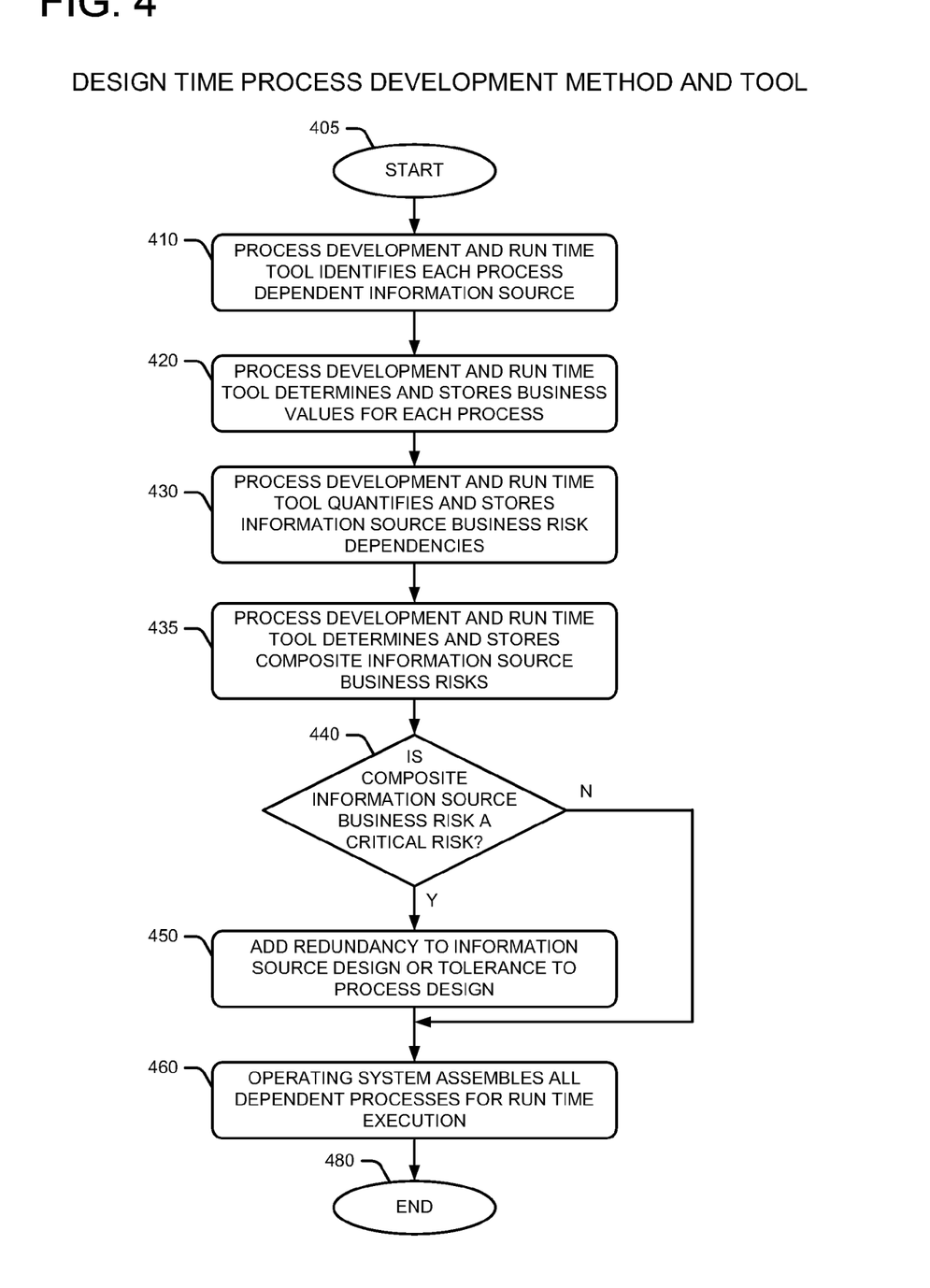
FIG. 4 depicts a flowchart of an embodiment of the disclosed process development method that provides design time risk assessment and process development capability.
Figure 5:
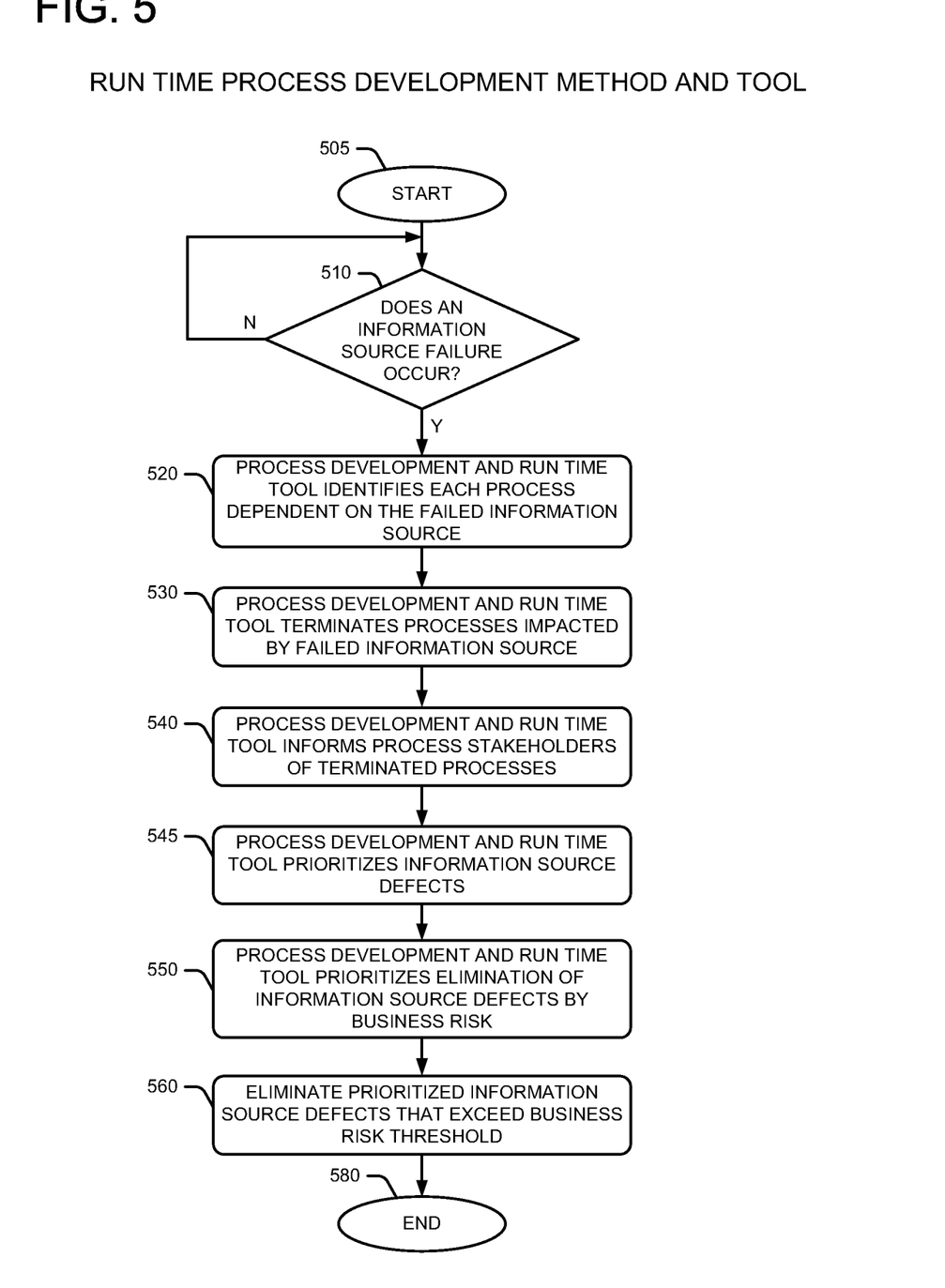
FIG. 5 depicts a flowchart of another embodiment of the disclosed process development method that provides run time risk assessment and process development capability.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart of FIG. 4 and FIG. 5 as described below.

Figure 2:
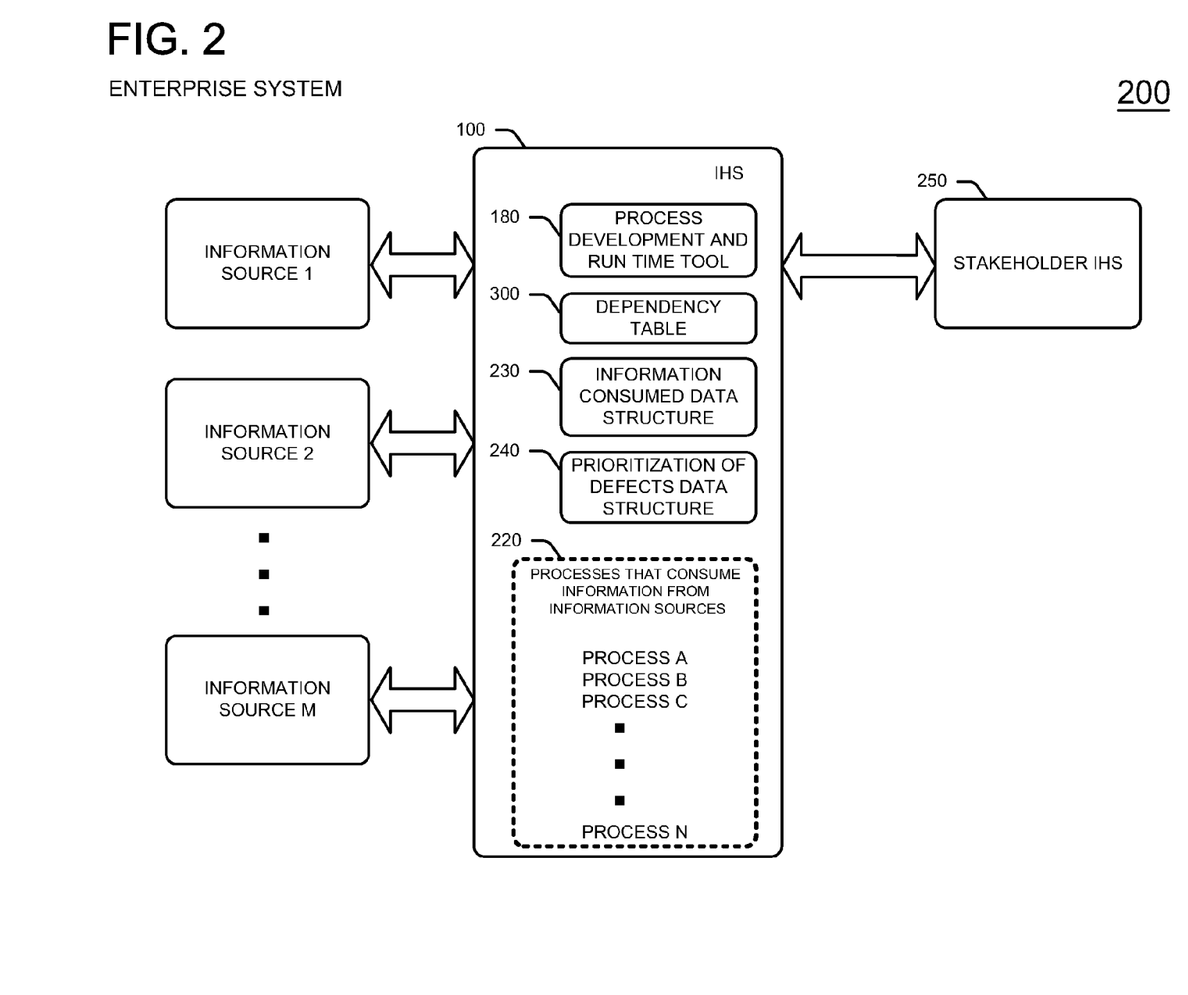
FIG. 2 depicts a block diagram of an enterprise system that employs the disclosed process development methodology.

FIG. 2 shows an enterprise business process management system or enterprise system 200. Enterprise system 200 employs IHS 100. IHS 100 includes processor development and run time tool 180 and dependency table 300 to practice the disclosed process development methodology. IHS 100 may execute one or more business processes such as process A, process B, process C, . . . process N, wherein N is the total number of processes that execute within IHS 100. Enterprise system 200 includes multiple information sources, namely information source 1, information source 2, . . . information source M wherein M is the total number of information sources. Information source 1, information source 2, . . . information source M each couple to IHS 100 to provide processes 220 with information. Processes 220 are processes that consume information from information sources 1, 2, . . . M. Processes 220 includes a group of executing processes, namely process A, process B, process C . . . process N that consume information from information source 1, information source 2, . . . information source M. In other words, each of processes 220 may consume information from one or more information source, namely information source 1, information source 2, . . . information source M.

In another embodiment of the disclosed process development methodology, one or more of the information sources, namely information source 1, information source 2, . . . information source M, may reside within a memory resource of IHS 100 or other entity of enterprise system 200. Information sources, namely information source 1, information source 2, . . . information source M may reside in other locations (not shown) outside of enterprise system 200. For example, these remote information sources may be databases on remote servers or other memory or storage resources in remote locations.

When processes 220, that includes executing processes such as process A, process B, process C, . . . process N, requires or consumes information from an information source, that information source is then a "dependent information source". In other words if an executing process, such as process A, consumes information from an information source, such as information source 1, that information source is then a dependent information source with respect to process A. In other words, in this example, process A employs dependent information source 1 as a source of information. If process A fails to receive accurate or timely information from dependent information source 1, process A may become unstable, shut down, or otherwise require intervention to terminate operation. In some cases, process A may attempt to repair operation after failing to receive information from an information source.

As described in more detail below, the higher the business value of a particular process executing within enterprise system 200, the higher the value of the particular processes dependent information source. Managing the proper operation of a particular information source is an significant aspect of the disclosed process development methodology. An information source may fail due to poor or missing communication between the information source and the consuming process. An information source may fail due to hard drive failure, database failure, and other reasons. If a process, such as those of executing processes of processes 220, requires information from an information source, such as information source 1, the communication between IHS 100 and information source 1 may be important to enterprise system 200 users. A loss or degradation of communication for any reason may cause one or more of executing processes of processes 220, and particularly those of critical business processes, to become unstable or produce unwanted or bad results. If the information in the dependent information source is defective, similar unstable or bad results may occur for information consuming processes 220.

Enterprise system 200 includes an information consumed data structure 230. Information consumed data structure 230 provides process development and run time tool 180 with information corresponding to those processes and activities that a particular process spawns or initiates. This information consumed data structure 230 may provide useful information for the development of process business risk assessment. Enterprise system 200 includes a prioritization of defects data structure 240. Prioritization of defects data structure 240 provides process development and run time tool 180 input into the development of information source defect risk assessment and prioritization of information source defects for elimination or other actions as described in more detail below.

Enterprise system 200 includes a stakeholder IHS 250. The stakeholder IHS 250 is a stakeholder or entity that employs one or more processes of executing processes, namely process A, process B, process C, . . . process N of processes 220. Stakeholder 250 may employ output, provide input, or otherwise interact with executing processes 220. Stakeholder IHS 250 couples to IHS 100. Stakeholder IHS 250 may be an IHS, or any form of stakeholder or interest in the output of executing processes of processes 220. In one embodiment of the disclosed process development methodology, stakeholder IHS 250 is a system administrator, user, designer or other entity receiving executing processes of processes 220 output in a manual method. In another embodiment of the disclosed process development methodology, stakeholder IHS 250 may be another process, such as a business process of enterprise system 200 that receives as input the output of one or more process of processes 220. Enterprise system 200 may include multiple stakeholders or stakeholder IHSs. Other stakeholder IHSs may reside in remote locations (not shown) outside of enterprise system 200.

Process development and run time tool 180 may merge or otherwise work in cooperation with OS 190, or other business process management tools (not shown) in accordance with the disclosed process development method. Process development and run time tool 180 may integrate or otherwise support and enhance the capabilities of existing business management processes and tools of enterprise system 200. Process development and run time tool 180 may generate or otherwise populate dependency table 300 within IHS system memory 125 or other memory of enterprise system 200. Process development and run time tool 180 employs the data of dependency table 300 to assess business risks as these risks pertain to information source and process dependencies.

Figure 3:
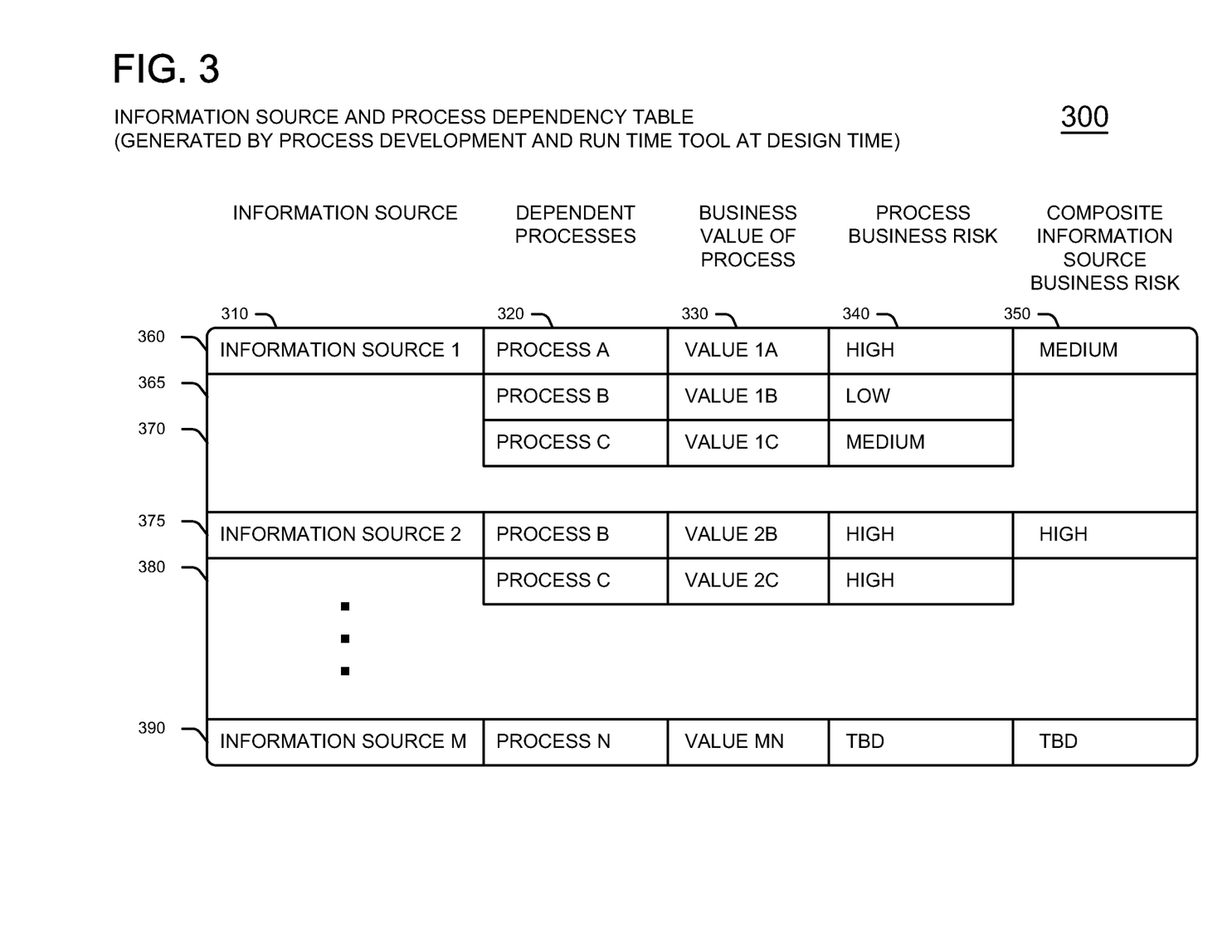
FIG. 3 shows an information source and process dependency table that the disclosed process development method employs.

FIG. 3 is a diagram of a representative information source and process dependency table 300. Process development and run time tool 180 populates dependency table 300 in accordance with the disclosed process development methodology. In one embodiment of the disclosed process development method, process development and run time tool 180 and/or designers or other entities populate dependency table 300 during design time or during enterprise system 200 planning and development. Dependency table 300 includes an "information source" column 310. Dependency table 300 includes information source 1, as shown in column 310, row 360. Dependency table 300 includes information source 2 in column 310, row 375. As shown in column 310, row 390, dependency table 300 includes information source M, wherein M is the total number of information sources in dependency table 300 and enterprise system 200 as described herein. In one embodiment of the disclosed process development method, process development and run time tool 180 may populate information source data of column 310 from multiple information sources. In other words, one information source, such as information source M may include multiple different information source inputs (not shown) from enterprise system 200.

At design time, dependency and run time tool 180 may populate each column of information in dependency table 300 respective to information source 1, information source 2, . . . information source M, with useful dependent process and business risk information. Column 320 includes "dependent processes" information corresponding to each information source of column 310. Column 320, row 360 includes an entry of process A. This entry describes the dependent relationship between process A and information source 1. In other words, process A requires or consumes information from information source 1. Stated in another manner, process A has as a dependent information source, information source 1 and information source 1 is a dependent information source of process A. Column 320, row 365, includes process B, and column 320, row 370, includes process C. As shown in rows 360, 365 and 370 of column 320, process A, process B and process C are all dependent processes of information source 1.

In a similar fashion, as shown in rows 375 and 380 of column 320, process B and process C are dependent processes of information source 2. Row 390, column 320 shows process N as a dependent process of information source M. Dependency table 300 includes a "business value of process" column 330. At design time, process development and run time tool 180 or other entity may populate business value of process column 330 with business value information for each of information source 1, information source 2, . . . information source M, wherein M is the total number of information sources.

Process development and run time tool 180 or other entity may determine the respective business value for each process of dependent processes column 320. Process development and run time tool 180 may determine and populate the business value of process data in column 330 in dependency table 300 from many key factors. These key factors may include monetary risk assessment of process outputs, such as those of processes 220. Other key factors that determine business value of process data in column 330 include return on investment analysis and critical business management risk assessment, as well as other factors. Other key business value factors may include criteria such as revenue generation, corporate liability, operational business risk and other factors.

Dependency table 300 includes process business value or "business value of process" information in column 330. For example, dependency table 300 includes a business value 1A in column 330, row 360. Value 1A may be a quantitative or other measure of the business value of a particular business process. In this manner, value 1A as shown in column 330, row 360, represents the business value of process A that employs dependent information source 1. In other words, value 1A represents one form of business value that process A provides. Dependency table 300 includes a business value 1B in column 330, row 365. Value 1B as shown in column 330, row 365, demonstrates the business value of process B employing dependent information source, namely information source 1. Dependency table 300 includes a business value 1C in column 330, row 370. Value 1C represents the business value of process C that employs dependent information source 1.

Dependency table 300 includes a business value 2B in column 330, row 375. Value 2B may be a quantitative or other measure of a particular process business value. In this manner, value 2B represents the business value of process B that employs dependent information source 2. In other words, value 2B represents the business value that process B provides. Dependency table 300 includes a business value 2C in column 330, row 380. Value 2C as shown in column 330, row 380, demonstrates the business value of process C employing dependent information source, namely information source 2.

Dependency table 300 includes a business value MN in column 330, row 390. Value MN represents the business value of process N that employs dependent information source M, wherein M is the total number of information sources, and N is the total number of processes executing in IHS 100. The "business value of process" data in column 330 of FIG. 3 demonstrates one form of process business value. Other forms or methods of demonstrating business value may include enterprise system 200 actions, such as business process procedures or other forms of business value determination.

The business value of process values of a particular information source may not completely describe the total or complete business risk of that particular information source. Process development and run time tool 180 may require other business risk input to determine the complete risk of a particular information source, and more particularly the business risk of a particular information source failure. Dependency table 300 includes "process business risk" column 340 information. Each process business risk entry in column 340 corresponds to a respective process of dependent processes column 320 and also corresponds to associated information sources in column 310. In one embodiment of the disclosed process development methodology, each process business risk entry in column 340 exhibits a high, medium, or low risk setting. Process development and run time tool 180 or other entities may use different quantitative or other business risk measures and methods to generate the information shown in dependency table 300 process business risk column 340. In other embodiments of the disclosed process development methodology, process development and run time tool 180 may determine business risk from other information of dependency table 300 than that of column 340 data, as well as other information of enterprise 200 resources.

In one embodiment of the disclosed process development methodology, process development and run time tool 180 quantifies and generates a business risk of "high" as shown in column 340, row 360, corresponding to process A, shown in column 320, row 360, and information source 1 as shown in column 310, row 360. Process development and run time tool 180 quantifies and generates process business risk measures as shown in column 340 for each process of column 320 for information sources shown in column 310. Process development and run time tool 180 or other entity stores that process business risk information in dependency table 300 as shown in FIG. 3 column 340. In one embodiment of the disclosed process development method, process business risk information shown in column 340 represents the risk to a particular system, such as enterprise system 200, in the case of a loss of a particular process or loss of a particular information source.

Dependency table 300 includes a process business risk of "low" as shown in column 340, row 365, that corresponds to process B, shown in column 320, row 365, and information source 1 shown in column 310, row 360. Dependency table 300 includes a process business risk of "medium" as shown in column 340, row 370, that corresponds to process C, shown in column 320, row 370, and information source 1 shown in column 310, row 360. In a similar manner, process development and run time tool 180 or other entity generates and populates dependency table 300 with process business risk information for information source 2 as shown in column 340 as well. Dependency table 300 includes a process business risk of "high" as shown in column 340, row 375, that corresponds to process B, shown in column 320, row 375, and information source 2 shown in column 310, row 375. Dependency table 300 includes a process business risk of "high" as shown in column 340, row 380, that corresponds to process C, shown in column 320, row 380, and information source 2 shown in column 310, row 375.

Dependency table 300 includes a process business risk of to-be-determined "TBD" as shown in column 340, row 390, that corresponds to process N, shown in column 320, row 390, and information source M shown in column 310, row 390. In other words, process development and run time tool 180 may populate the process business risk for process N, and information source M, wherein M is the total number of information sources, and N is the total number of processes, in a manner consistent with the teachings of the disclosed process development method.

Process development and run time tool 180 may generate "composite information source business risk level" shown in column 350 for each information source by combining the process business risk information of column 340 for each information source. Process development and run time tool 180 may interpret the information in column 340 and generate a cumulative or other combinational form of measure to produce an aggregate of all process business risk data from column 340 respective to each information source as shown in column 310. In this manner, process development and run time tool 180 may generate the composite information source business risk information, as shown in column 350 by combining business value data of process information from column 330. In one embodiment of the disclosed process development methodology, process development and run time tool 180 generates an accumulation of all process business risk information, as shown in column 340, for each information source of column 310. In this manner, process development and run time tool 180 generates and populates dependency table 300 with a "composite information source business risk" level as shown in column 350. This business risk level reflects the risk of information source defects or failure on processes such as those of processes 220 of enterprise system 200 that consume information from information sources, such as information 1, information 2, . . . information M.

Dependency table 300 includes a composite information source business risk of "medium" as shown in column 350, row 360, that corresponds to information source 1 as shown in column 310, row 360. In other words, process development and run time tool 180 determines that information source 1 provides medium business risk to enterprise system 200 and to those users or other entities that rely on processes that consume information source 1 data. Stated in another manner, a loss of information source 1, or defect in information source 1 data offers a medium business risk to the enterprise system 200 and stakeholders, such as stakeholder IHS 250.

Dependency table 300 includes a composite information source business risk of "high" as shown in column 350, row 375, that corresponds to information source 2 as shown in column 310, row 375. In other words, process development and run time tool 180 determines that information source 2 provides high business risk to enterprise system 200 and to those users or other entities that rely on processes that consume information source 2 data. A loss of information source 2, or defect in information source 2 data offers a high business risk to enterprise system 200 and stakeholders, such as stakeholder IHS 250. In one embodiment of the disclosed process development method, process development and run time tool 180 may generate or otherwise modify composite information source business risk information, as shown in column 350, with run time feedback, such as failure process rates or other information.

Dependency table 300 includes a composite information source business risk of "TBD" as shown in column 350, row 390, that corresponds to process N, shown in column 320, row 390, and information source M, as shown in column 310, row 390. In other words, process development and run time tool 180 may populate the information source business risk for process N, and information source M, wherein M is the total number of information sources, and N is the total number of processes, consistent with the teaching of the disclosed process development method. Process development and run time tool 180 may determine a particular threshold or setting for composite information source business risk, as shown in column 350. This threshold may provide process development and run time tool 180 a set point to identify those business risks that exhibit a critical or non-critical nature. For example, a composite information source business risk of high may be a critical business risk, wherein a composite information source business risk of medium may be a non-critical business risk.

The flowchart of FIG. 4 and FIG. 5 illustrates the architecture, functionality, and operation of possible implementations of systems, methods and computer program products that perform data packet management in accordance with various embodiments of the present invention. In this regard, each block in the flowchart of FIG. 4 and FIG. 5 may represent a module, segment, or portion of code, which comprises one or more executable instructions for implementing the specified logical function(s). It should also be noted that, in some alternative implementations, the functions noted in the block may occur out of the order noted in FIG. 4 and FIG. 5. For example, two blocks shown in succession may, in fact, be executed substantially concurrently, or the blocks may sometimes be executed in the reverse order, depending upon the functionality involved. It will also be noted that each block of FIG. 4 and FIG. 5 and combinations of blocks in the block diagrams and/or flowchart illustration, can be implemented by special purpose hardware-based systems that perform the specified functions or acts, or combinations of special purpose hardware and computer instructions.

FIG. 4 is a flowchart that shows process flow in an embodiment of the disclosed process development methodology that provides business risk assessment in an IHS. More specifically, the flowchart of FIG. 4 shows how process development and run time tool 180 provides for generation of business risk criteria and fault tolerance development during design time for processes that execute within enterprise system 200. The disclosed process development method provides for reduction in business risk for users of enterprise system 200 by providing at risk information source redundancy and establishing or increasing fault tolerant design in dependent processes.

It is useful to detect a potential information source failure prior to initiating assembly of the process for execution within resources of enterprise system 200. The earlier that the potential for information source failures is identified, the less expensive for designers to design in tolerance for those potential information source failures. When designers identify the potential for information source failures earlier, this may decrease the expense to design in tolerance to these information source failures. The disclosed process development method provides for the population of dependency table 300 with process value and business risk values corresponding to each information source of enterprise system 200. Process development and run time tool 180 or other entity may interpret information from dependency table 300 during modeling or design time operations. From this analysis of dependency table 300 data, process development and run time tool 180 may elect to modify or otherwise redesign aspects of enterprise system 200. This redesign of enterprise system 200 resources may improve fault tolerance capabilities of processes and information sources and provide for more efficient utilization of IHS 100 resources during execution of one more processes therein.

For example, in one embodiment of the disclosed process development methodology, a particular stock price information source provides stock prices that may impact stock trading transactions. Process development and run time tool 180 may quantify the business risk for a failure of that particular stock price information source by many risk factors. One risk factor may include the daily revenue and profit from stock trading transactions. Another risk factor may include image loss estimates, such as compensation costs and lawsuit cost that relate to inability to execute customer stock trade transactions. Another risk factor may include an estimate of operational risk from the inability to manage a corporations own trading positions in the stock market.

To reduce these risk factors, the disclosed process development method provides for redundancy in the particular stock price information source, such as including secondary sources for stock price information in case of failure of the primary stock price information source. The disclosed process development method may provide for fault tolerance design into the stock trading process. For example, one fault tolerance process design change may allow a senior floor trader to place trade orders at market price without using the normal pricing systems. The normal pricing systems may be at risk due to their dependency on the particular stock price information source.

The disclosed design time process development method starts, as per block 405. In one embodiment, process development and run time tool 180 identifies each process dependent information source, as per block 410. For example, process development and run time tool 180 may identify a particular process, such as process A of processes 220 that exhibits a dependent relationship with a particular information source, such as information source 1. In this manner, process development and run time tool 180 establishes a dependency relationship between dependent information source 1 and dependent process A. If information source 1 exhibits a defect, process A may suffer from that defective information and introduce potential risks to enterprise system 200 and users of this system. Referring to FIG. 3, process development and run time tool 180 may populate the information in column 310, namely information source data, and column 320, dependent process information thereby identifying the process dependent information source.

Process development and run time tool 180 determines and stores the business value for each process, as per block 420. As shown in FIG. 3 dependency table 300, process development and run time tool 180 may identify and store, as shown in column 330, a business value corresponding to each process as shown in column 320. This business value may provide basis for risk weighting in the case of a loss of information source data, such as described in more detail below. Process development and run time tool 180 quantifies and stores information source business risk dependencies, as per block 430. Process development and run time tool 180 determines process business risk and populates dependency table 300 as shown in FIG. 3 column 340.

By use of cumulative methods, or other aggregate means, process development and run time tool 180 generates composite information source business risk data for each information source. Process development and run time tool 180 determines and stores composite information source business risks, as per block 435. In one embodiment, as shown in FIG. 3 column 350, process development and run time tool 180 populates dependency table 300 with a composite business risk, namely a composite or overall information source business risk, for each information source of enterprise system 200. For example, the information source business risk in column 350, row 360, for information source 1 in column 310, row 360 is medium. The information source business risk in column 350, row 375, for information source 2 in column 310, row 375 is high. In other words, information source 2 provides a greater risk to enterprise system 200 and the users of enterprise system 200 in the case of information source 1 defects because of its high composite information source business risk than that of a defect of information source 2 that exhibits a medium composite information source business risk.

Process development and run time tool 180 performs a test to determine if any information source business risk is a critical risk, as per block 440. Process development and run time tool 180 may generate a business risk threshold that may identify some business risks as critical and other business risks as non-critical. For example, referring to FIG. 3, if any information source business risk data as shown in column 350 exhibits a high value, those corresponding information sources are critical. In this example, information source 1, as shown in column 310, row 360, exhibits a composite information source business risk value of medium, as shown in column 350, row, 360, and is a non-critical business risk. The corresponding information source, namely information source 1, as shown in column 310, row 360 is a non-critical information source. In the case of failure of information source 1, information source 1 is a non-critical information source failure. On the other hand, information source 2, as shown in column 310, row 375, exhibits a composite information source business risk value of high, as shown in column 350, row, 375, and is a critical business risk. The corresponding information source, namely information source 2, as shown in column 310, row 375 is a critical information source. In the case of failure of information source 2, information source 2 is a critical information source failure.

If the information source business risk exhibits a critical risk, process development and run time tool 180 adds redundancy to information source design, or fault tolerance to process design, as per block 450. For example, in the case of information source 2, as shown in column 310, row 375 of FIG. 3, the composite information source business risk is high as shown in column 350, row 375. In this case, process development and run time tool 180 may generate redundant information source design to reduce the risk of defect or loss of information source 2 resources. Process development and run time tool 180 may facilitate a copy of information source 2 into a new information source 2 (not shown) within enterprise system 200. The redundant information source may be a duplicate IHS, duplicate drive, duplicate database, or other redundant memory store.

Process development and run time tool 180 may re-design the processes of executing processes 200 that are dependent on information source 2, as a method of fault tolerance design. As shown in FIG. 3, dependency table 300 provides a list of processes dependent upon information source 2, namely process B and process C. Process development and run time tool 180 may enhance or otherwise provide input into modification of both process B and process C to provide fault tolerance to information source 2 defects. For example, process development and run time tool 180 may identify alternate process flows within process B and process C that redirect or reduce the impact of information source 2 defects or failure.

Modifications to processes for fault tolerance design may include local data caching of critical information, inclusion of retry operations for missing data, and many other techniques. If the information source business risk is non-critical, or after redundancy and fault tolerance design, operating system 190 assembles all dependent processes for run time execution, as per block 460. OS 190 or other resources of enterprise system 200 assemble or generate executable code (executable processes) from all dependent processes, such as shown in FIG. 3, column 320 for run time analysis. The disclosed design time process development methodology ends, as per block 480.

Run time of executable processes within enterprise system 200 provides other opportunities for business risk evaluation and reduction. For example, upon failure of a particular stock price information source, as described above in a previous example, the disclosed process development method provides for informing stakeholders, such as stakeholder IHS 250 of information source failures. Stakeholder IHS 250 is dependent upon the resources or data of the particular stock price information source. Stakeholder IHS 250 may initiate emergency actions, such as informing senior floor traders to begin using alternative trading processes that are not dependent upon the particular stock price information source.

The particular business process responsible for network banking (netbanking) applications may put up an indicator, such as a billboard, stating that stock trading is not currently possible. The particular business process may initiate calls to VIP trading clients offering alternative trading routes through the corporation's internal trading floor. Self service trading processes may terminate to avoid corrupt results due to faulty or missing stock price data. Stakeholder IHS 250 may initiate these and other emergency actions. Due to critical business risks, the disclosed process development method may provide for repair of the particular stock price information source as a higher priority than the repair of other information sources.

FIG. 5 shows a flowchart that shows process flow in an embodiment of the disclosed process development methodology that provides business risk assessment and improvement. More specifically, the flowchart of FIG. 5 shows how process development and run time tool 180 provides for identification of business process risk criteria and elimination of critical fault causes during run time for processes that execute within IHS 100. The disclosed process development method minimizes or reduces the business impact for enterprise system 200 users from information source defects or failure.

In more detail, the disclosed process development method provides for the identification of particular information source failure impact on processes dependent upon these particular information sources during execution of processes of processes 220. Process development and run time tool 180 or other entity may inform stakeholders, such as stakeholder IHS 250 that may be impacted by the particular information source failure. Process development and run time tool 180 may terminate and eliminate these particular processes that information source defects impact as they relate to measurable risk thresholds.

The disclosed run time process development method starts, as per block 505. In one embodiment, process development and run time tool 180 tests to determine if any information source fails as per block 510. If no information source failure occurs, process development and run time tool 180 continues monitoring enterprise system 200 executing processes of processes 220 for such a failure. An information source failure may occur because communication between the information source and the consuming process fails. An information source may also fail if that information source contains a defect in information. For example, a particular information source may contain the names and addresses of employees for a corporation and one or more of those entries may contain incorrect information. In this case, the particular information source is defective.

Information source failures may occur due to information inconsistency with respect to processes and activities consuming those information sources. For example, the information source may be incomplete for the requirements of the consuming process. The information source may fail to meet the information requirements of the consuming process. For example, the quality of the information source may fail to meet the requirements of the consuming process. The information source and data may not be available at the time that the consuming process requires. In one embodiment of the disclosed process development method, process development and run time tool 180 may not detect particular information source failures, but may rather detect that other resources of enterprise system 200 detect these particular information source failures.

If an information source failure occurs, process development and run time tool 180 identifies each process dependent on the failed information source, as per block 520. For example, if information source 2 fails, process development and run time tool 180 may refer to dependency table 300 to determine the dependent processes of information source 2 thereto. In this case, dependency table 300 shows that both process B and process C are dependent processes associated with information source 2. In one embodiment of the disclosed process development methodology, process development and run time tool 180 may output a list of dependent processes associated with failed information source 2 to other resources of enterprise system 200 or other stakeholders or resources (not shown) outside of enterprise system 200.

To reduce the risk that information source failures pose to stakeholders and other resources of enterprise system 200, process development and run time tool 180 may shut down, disable, eliminate, or otherwise terminate one or more process of executing processes of processes 220. In one embodiment, process development and run time tool 180 terminates processes impacted by information source failures, as per block 530. For example, in the case of information source 2 failure, process development and run time tool 180 terminates dependent process B and dependent process C. In this manner, process development and run time tool 180 removes the risk of process B and process C providing defective output to users or consumers of process information of enterprise system 200. In another embodiment of the disclosed process development methodology, process development and run time tool 180 does not directly terminate failed processes. However, process development and run time tool 180 does inform stakeholders, such as stakeholder IHS 250 or other resources of enterprise system 200 of the failed information source and provides for user intervention or other means of termination of high risk dependent processes.

Process development and run time tool 180 informs process stakeholders of terminated processes, as per block 540. In other words, once a process terminates, process development and run time tool 180 broadcasts this termination condition to resources of enterprise system 200 and more specifically to all stakeholders, such as stakeholder IHS 250. Stakeholder IHS 250 or other stakeholders (not shown) may require immediate or emergency action to eliminate or reduce the business risk from any particular information source failure. Process development and run time tool 180 prioritizes information source defects, as per block 545. For example process development and run time tool 180 may determine the business risk for each information source, as shown in dependency table 300 column 340.

Process development and run time tool 180 prioritizes elimination of information source defects by business risk, as per block 550. For example, process development and run time tool 180 may use the information source business risk data as shown in FIG. 3 column 350 to determine those information source failures that are high enough risk to consider for elimination. In one embodiment of the disclosed method, process development and run time tool 180 may determine any information source failure that corresponds to an information source business risk value of "high" as critical. Process development and run time tool 180 may then prioritize the failed information source, such as information source 2, as shown in FIG. 3 column 310, row 375, for elimination.

Process development and run time tool 180 may eliminate information source defects of a particular information source without elimination of the information source itself by bypassing defective information of the particular information source, or other techniques of information defect elimination. For example, process development and run time tool 180 may use backup information, such as other data stores that provide replacement for the information source defect. Process development and run time tool 180 may use other criteria, such as business criticality of dependent processes, business criticality of the failed information source, or other measures for determining elimination of failed information source defects and elimination priority. Process development and run time tool 180 may use data from prioritization of defects data structure 240 or other information during prioritization of information source defect elimination.

Using the elimination information source defect priority, users or other entities eliminate prioritized information source defects that exceed a particular business risk threshold, as per block 560. In one embodiment, process development and run time tool 180 may eliminate prioritized information source defects that exceed a particular business risk threshold. A user or other entity may identify a business risk of high as the business risk threshold. In this case, if information source 2 fails, then the user or other entity eliminates information source 2 defects by shutting that corresponding information source down or otherwise eliminating or isolating that defective information source content from other resources of enterprise system 200. In one embodiment of the disclosed process development method, users or other entities of enterprise system 200 may terminate or otherwise eliminate processes that consume prioritized information source defects that exceed a predetermined business risk threshold. The disclosed run time process development methodology ends, as per block 580.

The above method provides for a run time system that exhibits recovery capability from information source failure. In one embodiment, alternative process flow for dependent processes associated with failed information sources may provide continued flow of dependent processes. In this example, the disclosed method may provide for alternative information sources as redundant information sources. Executing dependent process may employ redundant information sources so that processing may continue without interruption of services to stakeholders, resources, and other users of enterprise system 200.

As will be appreciated by one skilled in the art, aspects of the disclosed process development management technology may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A method, comprising:
    forming at design time, by a process development and run time tool executing on a processor in an information handling system (IHS), a dependency table stored in the IHS that includes a list of information sources with dependent processes, the dependency table further including a list of business values, each business value corresponding to a respective dependent process, the dependency table further including a list of business risks, each business risk corresponding to a respective dependent process, the dependency table further including a respective composite information source business risk for each information source in the list of information sources, wherein the composite information source business risk for each given information source is generated based on the list of business values for the dependent processes of the given information source and the list of business risks for the dependent processes of the given information source;

identifying at design time, by the process development and run time tool in the IHS, those information sources of the list of information sources in the dependency table that exhibit a composite information source business risk that exceeds a predetermined business risk threshold, thus providing identified critical information sources;

modifying at design time by the IHS, processes from the dependency table that are dependent on identified critical information sources to provide fault tolerance to those processes, wherein the fault tolerance includes local caching of the processes dependent on the identified critical information sources;

adding redundancy to identified critical information sources;

assembling, at design time by the IHS, the modified processes for run time analysis;

executing the processes and modified processes in the IHS that receive information from the information sources;

detecting at run time, by the process development and run time tool in the IHS, information source failures, thus designating failed information sources;

identifying at run time, by the process development and run time tool in the IHS, those processes or modified processes executing on a processor in the IHS dependent on the failed information sources, based on the dependency table, as exhibiting information source defects;

terminating at run time, by the process development and run time tool in the IHS, execution of those processes or modified processes dependent on the failed information sources, thus providing terminated processes;

communicating at run time, by the process development and run time tool in the IHS, a list of the terminated processes, identified from the dependency table, to stakeholders of the terminated processes;

prioritizing at run time, by the process development and run time tool in the IHS, failed information sources in accordance with the composite information source business risk, the prioritizing at run time designating particular failed information sources as critical information source failures or non-critical information source failures in accordance with the predetermined business risk threshold; and bypassing at run time, by the process development and run time tool in the IHS, those failed information sources that correspond to critical information source failures, the bypassing of the particular failed information sources being achieved by replacing information source defects with backup information from data stores.

2. The method of claim 1, wherein the predetermined business risk threshold is associated with critical business risk.

3. The method of claim 1, wherein the identifying at run time step comprises accessing, by the process development and run time tool, the dependency table to determine those processes dependent on the particular information source.

4. An information handling system (IHS), comprising:
a processor;
information sources coupled to the processor;
a memory coupled to the processor, the memory being configured with a process development and run time tool, wherein the process development and run time tool executes on the processor to:
form at design time a dependency table stored in the IHS that includes a list of information sources with dependent processes, the dependency table further including a list of business values, each business value corresponding to a respective dependent process, the dependency table further including a list of business risks, each business risk corresponding to a respective dependent process, the dependency table further including a respective composite information source business risk for each information source in the list of information sources, wherein the composite information source business risk for each given information source is generated based on the list of business values for the dependent processes of the given information source and the list of business risks for the dependent processes of the given information source;

identify at design time those information sources of the list of information sources in the dependency table that exhibit a composite information source business risk that exceeds a predetermined business risk threshold, thus providing identified critical information sources;

modify at design time processes from the dependency table that are dependent on identified critical information sources to provide fault tolerance to those processes, wherein the fault tolerance includes local caching of the processes dependent on the identified critical information sources;

add redundancy to identified critical information sources;

assemble, at design time by the IHS, the modified processes for run time analysis;

execute the processes and modified processes in the IHS that receive information from the information sources;

detect at run time information source failures, thus designating failed information sources;

identify at run time those processes or modified processes executing on a processor in the IHS dependent on the failed information sources, based on the dependency table, as exhibiting information source defects;

terminate at run time execution of those processes or modified processes dependent on the failed information sources, thus providing terminated processes;

communicate at run time a list of the terminated processes, identified from the dependency table, to stakeholders of the terminated processes;

prioritize at run time failed information sources in accordance with the composite information source business risk, the prioritizing at run time designating particular failed information sources as critical information source failures or non-critical information source failures in accordance with the predetermined business risk threshold; and bypass at run time those particular failed information sources that correspond to critical information source failures, the bypassing of the particular failed information sources being achieved by replacing information source defects with backup information from data stores.

5. The IHS of claim 4, wherein the predetermined business risk threshold is associated with critical business risk.

6. The IHS of claim 4, wherein the process development and run time tool accesses the dependency table at run time to determine those processes dependent on the particular information source.

7. A process development and run time tool computer program product, comprising:
- a non-transitory computer readable storage medium;
- first program instructions that, when executed by a processor in an information handling system (IHS), form at design time a dependency table stored in the IHS that includes a list of information sources with dependent processes, the dependency table further including a list of business values, each business value corresponding to a respective dependent process, the dependency table further including a list of business risks, each business risk corresponding to a respective dependent process, the dependency table further including a respective composite information source business risk for each information source in the list of information sources, wherein the composite information source business risk for each given information source is generated based on the list of business values for the dependent processes of the given information source and the list of business risks for the dependent processes of the given information source;
- second program instructions that, when executed by a processor, identify at design time those information sources in the dependency table that exhibit a composite information source business risk that exceeds a predetermined business risk threshold, thus providing identified critical information sources;
- third program instructions that, when executed by a processor, modify at design time processes from the dependency table that are dependent on identified critical information sources to provide fault tolerance to those processes, wherein the fault tolerance includes local caching of the processes dependent on the identified critical information sources;
- fourth program instructions that, when executed by a processor, add redundancy to identified critical information sources;
- fifth program instructions that, when executed by a processor, assemble at design time the modified processes for run time analysis;
- sixth program instructions that, when executed by a processor, execute the processes and modified processes in the IHS that receive information from the information sources;
- seventh program instructions that, when executed by a processor, detect at run time information source failures, thus designating failed information sources;
- eighth program instructions that, when executed by a processor, identify at run time those processes or modified processes executing on a processor in the IHS dependent on the particular failed information sources, based on the dependency table, as exhibiting information source defects;
- ninth program instructions that, when executed by a processor, terminate at run time execution of those processes or modified processes dependent on the failed information sources, thus providing terminated processes;
- tenth program instructions that, when executed by a processor, communicate at run time a list of the terminated processes, identified from the dependency table, to stakeholders of the terminated processes;
- eleventh program instructions that, when executed by a processor, prioritize at run time particular failed information sources in accordance with the composite information source business risk, the prioritizing at run time designating particular failed information sources as critical information source failures or non-critical information source failures in accordance with the predetermined business risk threshold; and
- twelfth program instructions that, when executed by a processor, bypass at run time those particular failed information sources that correspond to critical information source failures, the bypassing of the particular failed information sources being achieved by replacing information source defects with backup information from data stores,
- wherein the first, second, third, fourth, fifth, sixth, seventh, eighth, ninth, tenth, eleventh, and twelfth program instructions are stored on the non-transitory computer readable storage medium.

8. The process development and run time tool computer program product of claim 7, wherein the predetermined business risk threshold is associated with critical business risk.

9. The process development and run time tool computer program product of claim 7, further comprising tenth program instructions that access the dependency table at run time to determine those processes dependent on the particular information source.

* * * * *